United States Patent [19]
Eastty et al.

[11] Patent Number: 5,983,258
[45] Date of Patent: Nov. 9, 1999

[54] APPARATUS AND METHOD FOR SUMMING 1-BIT SIGNALS

[75] Inventors: Peter Charles Eastty, Oxford; Christopher Sleight, Chipping Norton; Peter Damien Thorpe, Oxford, all of United Kingdom

[73] Assignees: Sony Corporation, Tokyo, Japan; Sony United Kingdom Limited, Weybridge, United Kingdom

[21] Appl. No.: 08/979,469

[22] Filed: Nov. 26, 1997

[30] Foreign Application Priority Data

Nov. 27, 1996 [GB] United Kingdom ................... 9624643

[51] Int. Cl.$^6$ ....................................................... G06F 7/50
[52] U.S. Cl. ............................................................ 708/603
[58] Field of Search ........................... 364/750.5, 736.02, 364/268; 708/603, 523, 670

[56] References Cited

U.S. PATENT DOCUMENTS

| | | | |
|---|---|---|---|
| 4,357,674 | 11/1982 | Ikeda et al. ............................... | 364/768 |
| 5,442,577 | 8/1995 | Cohen .................................. | 364/716.05 |
| 5,796,645 | 8/1998 | Peh et al. .............................. | 364/750.5 |

*Primary Examiner*—David H. Malzahn
*Attorney, Agent, or Firm*—Frommer Lawrence & Haug, LLP

[57] ABSTRACT

An arithmetic stage calculates the sum AX+BY where A and B are 1-bit signals and X and Y p bit coefficients X=7 and Y=3 and the corresponding bits $b_1$ to $b_5$ are represented together with the corresponding logical states of A and B. It will be seen that for example column $b_3$ together with columns A and B is the truth table of an NAND gate. Column $b_2$ together with columns A and B is the truth table of a COINCIDENCE gate.

In the example of FIG. 5 column $b_4$ equals B; column $b_1$ is logical 0 whatever the states of A and B; and column $b_5$ is NOT A.

Thus in accordance with one illustrative embodiment of the invention the arithmetic stage 40 may be implemented by the logic circuit of FIG. 6 where bit $b_5$ is produced by inverting A,
bit $b_4$ is produced by coupling output $b_1$ to input B, via a direct connection 60,
bit $b_3$ is produced by a NAND gate 61,
bit $b_2$ is produced by a COINCIDENCE gate 62, and
bit $b_1$ is produced by coupling output $b_4$ to a source of logical '0' via a connection 63.

15 Claims, 6 Drawing Sheets

| A | B | b5 | b4 | b3 | b2 | b1 | |
|---|---|----|----|----|----|----|---|
| 1 | 1 | 0 | 1 | 0 | 1 | 0 | +7+3 |
| 1 | 0 | 0 | 0 | 1 | 0 | 0 | +7−3 |
| 0 | 1 | 1 | 1 | 1 | 0 | 0 | −7+3 |
| 0 | 0 | 1 | 0 | 1 | 1 | 0 | −7−3 |

$\overline{A}$   B   NAND   C   O

| A | B | b1 | b2 | b3 | b4 | | |
|---|---|----|----|----|----|---|---|
| 1 | 1 | 0 | 1 | 0 | 0 | +1.5 | +0.5 |
| 1 | 0 | 0 | 0 | 1 | 0 | +1.0 | −0.5 |
| 0 | 1 | 1 | 1 | 1 | 0 | −1.5 | +0.5 |
| 0 | 0 | 1 | 1 | 0 | 0 | −1.5 | −0.5 |

APPARATUS AND METHOD FOR SUMMING 1-BIT SIGNALS

BACKGROUND OF THE INVENTION

1. Field of the invention

The present invention relates to an arithmetic stage for forming the sum of the products of 1-bit signals with coefficients. Such a sum of products of 1-bit signals is calculated in for example a 1-bit signal processor comprising an nth order Delta-Sigma Modulator where n is at least one. An embodiment of the invention relates to such a 1-bit signal processor. Preferred embodiments of the invention relate to processing audio signals but the invention is not limited to audio signal processors.

2. Description of the Prior Art

Figure 1:
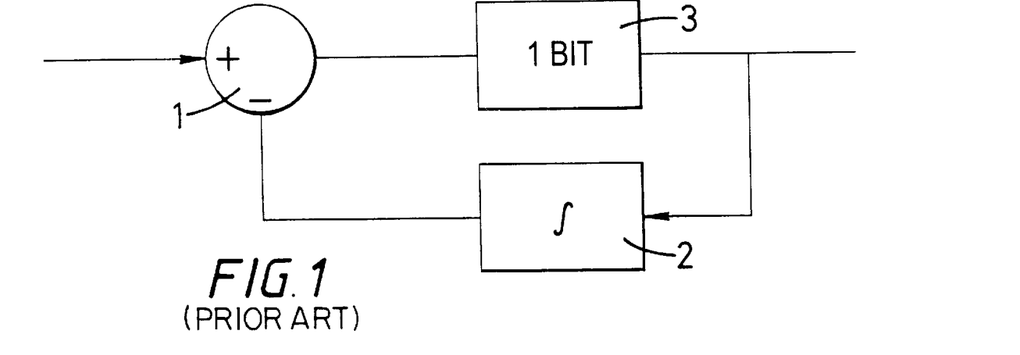
FIG. 1 is a schematic block diagram of an analog-to-digital converter.
Figure 2:
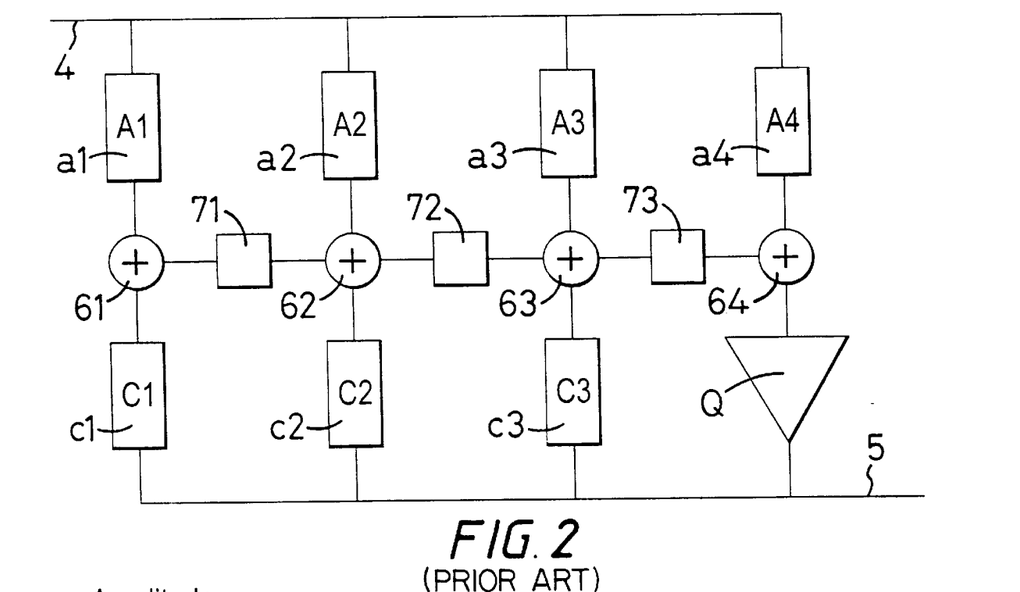
FIG. 2 is a schematic block diagram of a Delta-Sigma modulator.
Figure 3:
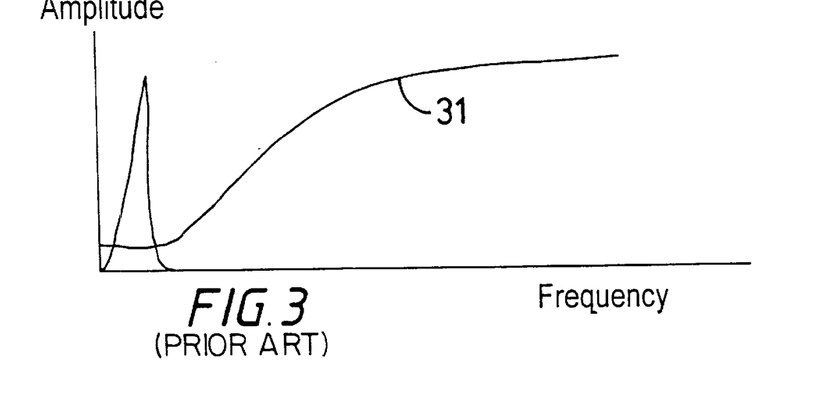
FIG. 3 is a graph of an audio signal.

Background to the present invention will now be described by way of example with reference to FIGS. 1, 2 and 3 of the accompanying drawings of which FIG. 1 is a block diagram of a known Delta-Sigma Modulator, FIG. 2 is a block diagram of a previously proposed Delta-Sigma Modulator configured as an nth order filter section and FIG. 3 shows a noise shaping characteristic.

It is known to convert an analogue signal to a digital form by sampling the analogue signal at at least the Nyquist rate and encoding the amplitudes of the samples by an m bit number. Thus if m=8, the sample is said to be quantized to an accuracy of 8 bits. In general m can be any number of bits equal to or greater than 1.

For the purpose of quantizing to only 1 bit, it is known to provide an analogue to digital converter (ADC) known either as a "Sigma-Delta ADC" or as a "Delta-Sigma ADC". Herein the term "Delta-Sigma" is used. Such an ADC is described in for example "A Simple Approach to Digital Signal Processing" by Craig Marven and Gillian Ewers ISBN 0-904.047-00-8 published 1993 by Texas Instruments.

Referring to FIG. 1 in an example of such an ADC, the difference (Delta) between an analogue input signal and the integral (Sigma) of the 1-bit output signal is fed to a 1-bit quantizer 3. The output signal comprises bits of logical value 0 and 1 but representing actual values of −1 and +1 respectively. The integrator 3 accumulates the 1-bit outputs so that value stored in it tends to follow the value of the analog signal. The quantizer 3 increases (+1) or reduces (−1) the accumulated value by 1-bit as each bit is produced. The ADC requires a very high sampling rate to allow the production of an output bit stream the accumulated value of which follows the analogue signal.

The term "1-bit" signal as used in the following description and in the claims means a signal quantized to an accuracy of 1 digital bit such as is produced by a Delta-Sigma ADC.

A Delta-Sigma Modulator (DSM) configured as nth order filter section for directly processing a 1-bit signal was proposed by N. M. Casey and James A. S. Angus in a paper presented at 95th AES Convention Oct. 7–10, 1993 New York, U.S.A. entitled "One Bit Digital Processing of Audio Signals"—Signal Processing: Audio Research Group, The Electronics Department, The University of York, Heslington, York YO1 5DD England. FIG. 2 shows a 3rd order (n=3) version of such a DSM filter section.

Referring to FIG. 2, the DSM has an input 4 for a 1-bit signal and an output 5 at which a processed a 1-bit signal is produced. The bits of the 1-bit signal are clocked through the DSM by known clocking arrangements which are not shown. The output 1-bit signal is produced by a 1-bit quantizer Q which is for example a comparator having a threshold level of zero. The DSM has three integrator stages each comprising a first 1-bit multiplier $a_1$, $a_2$, $a_3$ connected to the input 4, a second 1-bit multiplier $c_1$, $c_2$, $c_3$ connected to the output 5, an adder $6_1$, $6_2$, $6_3$ and an integrator $7_1$, $7_2$, $7_3$.

The 1-bit multipliers multiply the received 1-bit signal by p bit coefficients $A_1$, $A_2$, $A_3$, $C_1$ $C_2$, $C_3$ producing p bit products which are added by the adders $6_1$, $6_2$, $6_3$ and the sums passed to the integrators 7. In the intermediate stages the adders $6_2$, $6_3$ also sum the output of the integrator of the preceding stage. A final stage comprises another 1-bit multiplier $A_4$ connected to the input which multiplies the input signal by a p bit coefficient $A_4$ and an adder $6_4$ which adds the product to the output of the integrator $7_3$ of the preceding stage. The sum is passed to the quantizer Q.

Within the DSM, two's complement arithmetic is used to represent the positive and negative p bit numbers. The input to the quantizer Q may be positive, quantized at the output as +1 (logical 1) or negative quantized at the output as −1 (logical 0).

As observed by Casey and Angus "a one bit processor . . . will produce a one bit output that contains an audio signal that is obscured by noise to an unacceptable level and it is imperative the quantization noise is suitably shaped". The noise which obscures the audio signal is the quantization noise produced by the quantizer Q.

The quantizer Q may be modelled as an adder which has a first input receiving an audio signal and a second input receiving a random bit stream (the quantization noise) substantially uncorrelated with the audio signal. Modelled on that basis, the audio signal received at the input 4 is fed forward by multipliers $a_1$, $a_2$, $a_3$, $a_4$ to the output 5 and fed back by multipliers $c_1$, $c_2$, $c_3$ from the output 5. Thus coefficients $A_1$ to $A_4$ define zeros of the Z-transform transfer function of the audio signal and coefficients C1–C3 define poles of the transfer function of the audio signal.

The noise signal, however is fed-back from the quantizer by the multipliers $C_1$–$C_3$ so that coefficients C1–C3 define poles of the transfer function of the noise signal.

The coefficients A1 to A4 and C1 to C3 are chosen to provide circuit stability amongst other desired properties.

The coefficients C1–C3 are chosen to provide noise shaping so as to minimise quantization noise in the audio band, as shown for example in FIG. 3 by the full line 31.

The coefficients A1–A4 and C1–C3 are also chosen for a desired audio signal processing characteristic.

The coefficients A1–A4 and C1–C3 may be chosen by:
a) finding the Z-transform H(z) of the desired filter characteristic—e.g noise shaping function; and
b) transforming H(z) to coefficients.
This may be done by the methods described in
"Theory and Practical Implementation of a Fifth Order Sigma-Delta A/D Converter, Journal of Audio Engineering Society, Volume 39, no. 7/8, 1991 July/August by R. W Adams et al."
and in the above mentioned paper by Casey and Angus using the knowledge of those skilled in the art. One way of calculating the coefficients is outlined in the accompanying Annex A.

Whilst such a filter section avoids p bit multipliers by using 1-bit multipliers, the bit rate of the bit stream is high requiring correspondingly fast generation of the sums of the products of the coefficients and the 1-bit signals.

SUMMARY OF THE INVENTION

According to one aspect of the present invention, there is provided an arithmetic stage for forming the sum AX+BY of the products AX and BY of two 1-bit signals A and B with respective coefficients X and Y, the sum having 4 values +X+Y, +X−Y, −X+Y and −X−Y, each value having p bits where p is at least two, the processor comprising means defining the truth table logically relating the four logical states of A and B to the corresponding four sets of p bits representing the respective ones of the said values, the defining means having inputs for receiving A and B and an output for outputting the set of p bits corresponding to the states A and B as received at the said inputs.

According to another aspect of the present invention, there is provided an arithmetic stage for forming the sum AX+BY of the products AX and BY of two 1-bit signals A and B with respective coefficients X and Y, the sum having 4 values +X+Y, +X−Y, −X+Y and −X−Y, each having p bits, the stage comprising an arithmetic stage for forming the sum AX+BY of the products AX and BY of two 1-bit signals A and B with respective coefficients X and Y, the sum having 4 values +X+Y, +X−Y, −X+Y and −X−Y, each value having p bits, the apparatus comprising a logic circuit having two inputs for receiving A and B respectively, p outputs, the p outputs outputting respective ones of the p bits of the sum, and a plurality of logic gates, the logic circuit implementing the logical function relating the four logical states of A and B to the corresponding four sets of bits representing the sum AX+BY.

This allows the fast generation of the required arithmetic function responsive to the 1-bit signals A and B without requiring expensive p bit multipliers and full adders which would operate relative slowly.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 4:
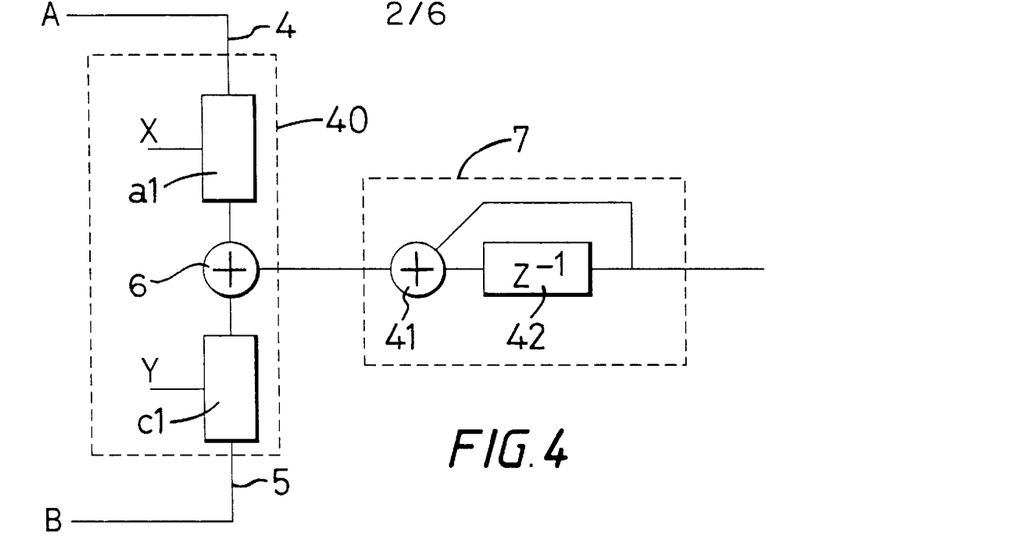
FIG. 4 is a schematic block diagram of an integrator stage of a DSM.

Referring to FIG. 4, the integrator stage shown corresponds in function to an integrator stage of the known DSM of FIG. 2. Two 1-bit signals A and B are supplied to an arithmetic stage 40 from for example the input 4 of the DSM and the output 5 of the DSM. The arithmetic stage is shown schematically as having a first 1-bit multiplier $a_1$ which multiplies 1-bit signal A by p bit coefficient X, a second 1-bit multiplier $c_1$ which multiplies 1-bit signal B by p bit coefficient Y, and an adder 6 which forms the sum AX+BY.

Figure 6:
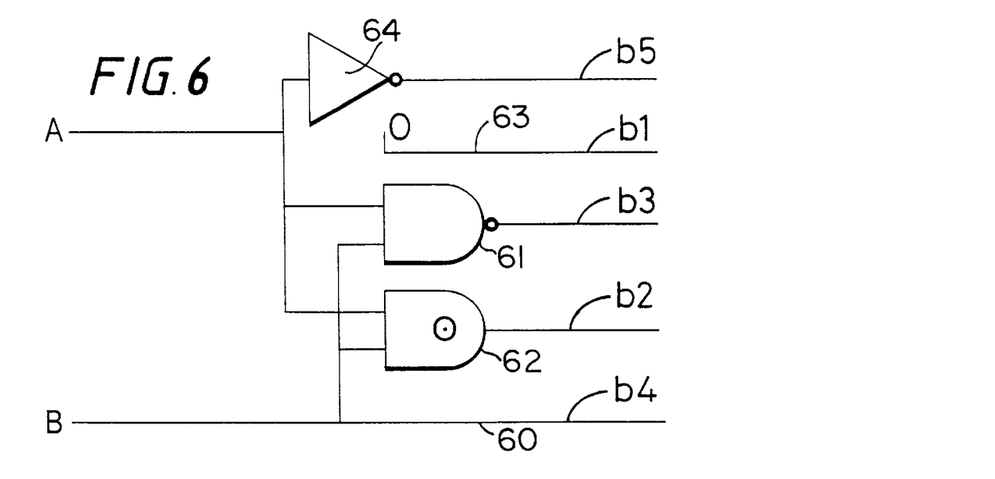
FIG. 6 is logic circuit implementing the illustrating set of truth tables of FIG. 5.

In effect in accordance with an illustrative embodiment of the invention, the arithmetic stage has stored in it all possible values of the sum AX+BY. The correct value is chosen by the states of A and B at the input. That allows the sum to be produced very quickly. The truth table may be represented by a 'hard-wired' logic circuit where X and Y are fixed as illustrated in FIG. 6 or 7B.

Figure 9:
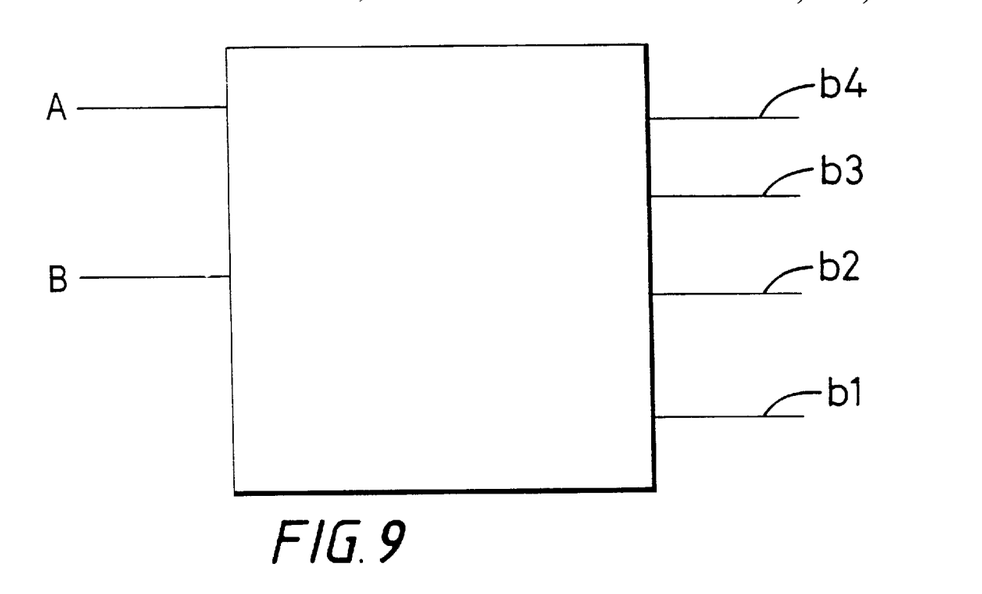
FIG. 9 is a schematic diagram of a store used as a look-up table.

Alternatively the truth table may be stored as a look-up table in a suitable stored addressed by A and B as shown in FIG. 9. If the coefficients are fixed the store may be a ROM. The coefficients may be variable and the store a writable store. In an embodiment, a calculation circuit responds to instantaneous values of the variable coefficients to calculate the corresponding truth table which is stored in the store. The truth table is then addressed by the signals A and B.

The sum AX+BY is fed to an integrator 7. The integrator comprises a further adder 41 and a unit delay 42.

The output of the unit delay 42 is fed back to the adder 41 which accumulates the integral of AX+BY.

The sum AX+BY is for example a p bit number.

A and B each have logical states 1 and 0 signifying +1 and −1 respectively. Thus the sum has four possible values each of p bits

|      | A | B |
|------|---|---|
| +X+Y | 1 | 1 |
| +X−Y | 1 | 0 |
| −X+Y | 0 | 1 |
| −X−Y | 0 | 0 |

In accordance with the present invention, each bit of the sum AX+BY is a logical function of the states of A and B. For example, consider fixed coefficients X=7 and Y=3 and represented as 5 bit numbers having bits $b_1$ to $b_5$ in twos complement form:

|       | $b_5$ | $b_4$ | $b_3$ | $b_2$ | $b_1$ |
|-------|-------|-------|-------|-------|-------|
| +7 =  | 0     | 0     | 1     | 1     | 1     |
| +3 =  | 0     | 0     | 0     | 1     | 1     |
| −7 =  | 1     | 1     | 0     | 0     | 1     |
| −3 =  | 1     | 1     | 1     | 0     | 1     |

Figure 5:
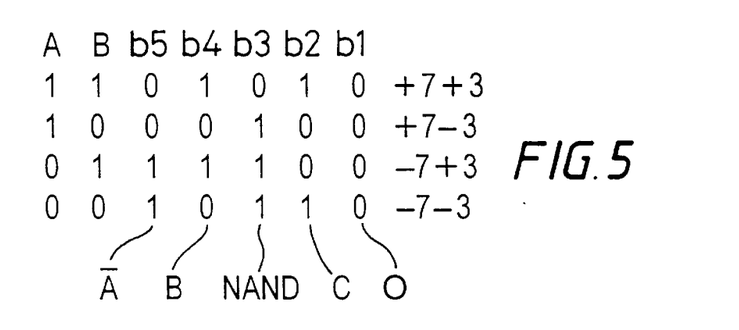
FIG. 5 is a set of truth tables relating the states of 1-bit input signals A and B to illustrate sums of products of the signals A and B with respective coefficients.

Referring to FIG. 5 the four possible values of the sum AX+BY where X=7 and Y=3 and the corresponding bits $b_1$ to $b_5$ are represented together with the corresponding logical states of A and B. It will be seen that for example column $b_3$ together with columns A and B is the truth table of a gate. Column $b_2$ together with columns A and B is the truth table of a COINCIDENCE gate (C).

In the example of FIG. 5 column $b_4$ equals B and column $b_1$ is logical 0 whatever the states of A and B. Column $b_5$ equals NOT A.

Thus in accordance with one illustrative embodiment of the invention the arithmetic stage 40 may be implemented by the logic circuit of FIG. 6 where bit $b_4$ is produced by coupling output $b_4$ to input B, via a direct connection 60, bit $b_3$ is produced by a NAND gate 61,
bit $b_2$ is produced by a COINCIDENCE gate 62,
bit $b_1$ is produced by coupling output $b_1$ to a source of logical '0' via a connection 63, and
bit $b_5$ is produced by a NOT gate 64 having A as an input.

In a currently preferred embodiment of the invention the coefficients X and Y have non-integer values which may be positive or negative. The coefficients are implemented in fixed point twos complement arithmetic with a binary point placed in a suitable place. The maximum value which can be stored in the integrator 7 of each integrator stage is known in advance. The binary point is placed in a suitable place to be able to store maximal integrator values.

Figure 7A:
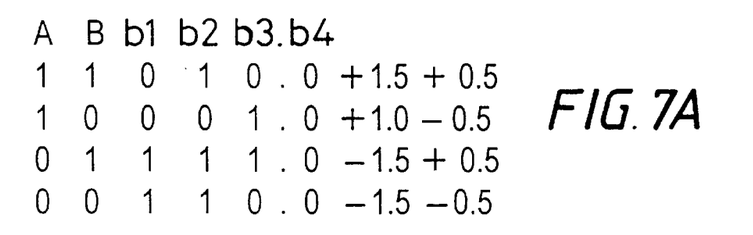
FIGS. 7A and 7B are another set of truth tables and a logic circuit implementing the set and illustrating fixed point arithmetic.
Figure 7B:
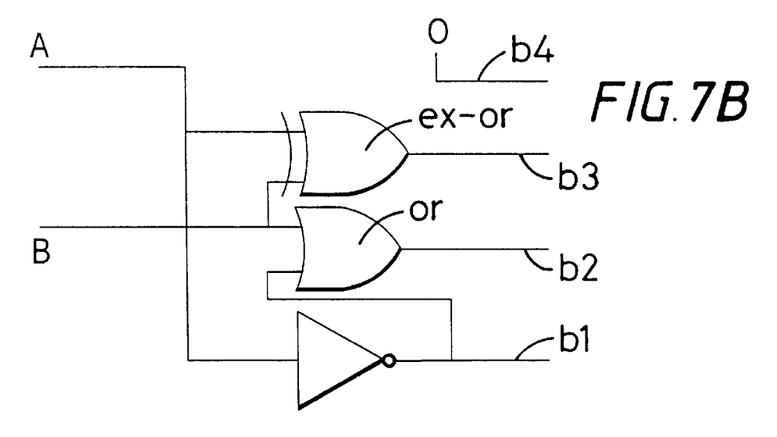

Referring to FIGS. 7A and 7B as an example of the use of fixed point non-integer values, let X=1.5 and Y=0.5.

The resulting truth table is shown in FIG. 7A and the equivalent logic circuit shown in FIG. 7B.

Figure 8:
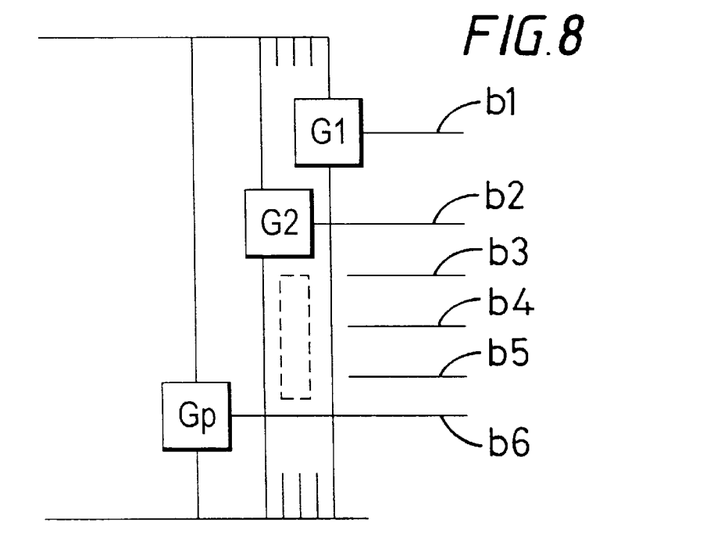
FIG. 8 shows a generalised logic circuit.

Referring to FIG. 8, the p bits of the sum AX+BY are produced by p logic gates G1 to Gp the fixed logical functions of which are dependent on the fixed values X and Y. As is evident from e.g. FIG. 6 a gate in this context may be a simple connection as in $b_1$ or a source of fixed logical value as in $b_4$.

It is not necessary to provide hard-wired logic gates to implement the truth table resulting from calculating AX+BY for the 4 states of A and B.

The truth table may simply be stored as a look-up table in a memory device such as a ROM addressed by A and B as schematically shown in FIG. 9.

The foregoing description concerns fixed values for the coefficients A and Y. In a further embodiment of the invention X and Y are variable. Variable coefficients are generated in for example a 1-bit signal processor comprising a DSM as described in co-filed application 9624671.5 (I-96-24 P/1509.GB), the signal processor being a signal mixer.

Figure 10:
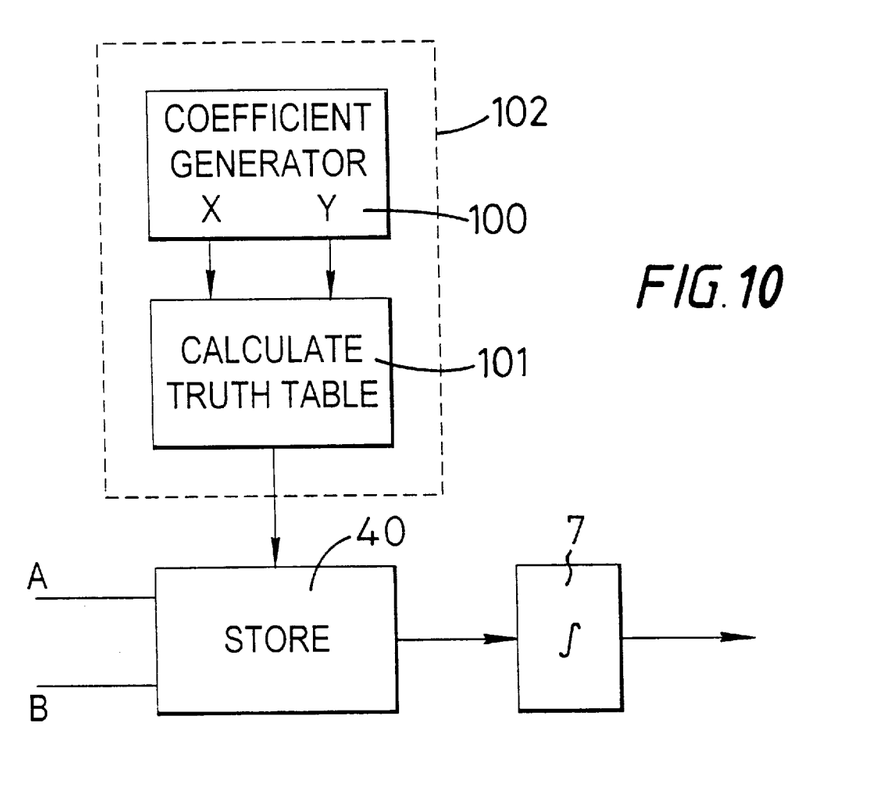
FIGS. 10 and 11 are schematic block diagrams of arithmetic stages for use with variable coefficients.

Referring to FIG. 10, variable coefficients X and Y are generated by a coefficient generator 100 and fed to a processor 101. The processor 101 calculates for each of the four states of the 1-bit signals A and B the p bits of the sum AX+BY. The p bits of each of the four states constitutes a truth table as shown in e.g. FIG. 5 or FIG. 7A. The truth table is stored in a memory device indicated by FIG. 10 block 40 corresponding to the arithmetic stage 40 of FIG. 4. The truth table is stored as a look-up table, addressed by A and B. The state of A and B as input to the store 40 select the appropriate set of p bits from the truth table, which are output as the appropriate sum AX+BY, and fed to the integrator 7 of the DSM arithmetic stage.

Figure 11:
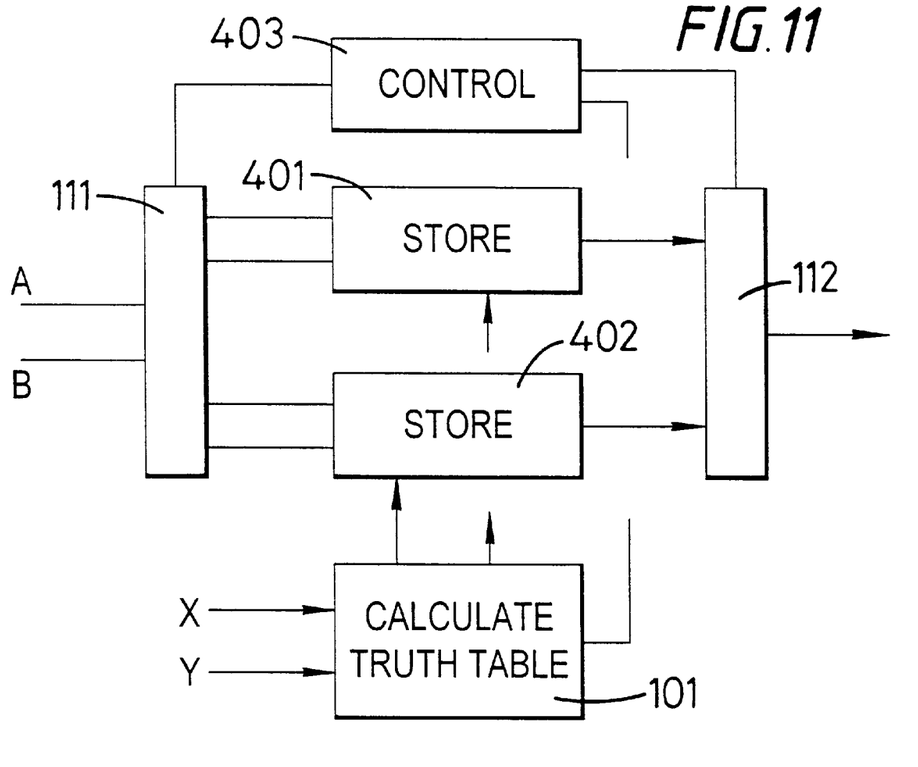

Referring to FIG. 11, in a preferred embodiment, at least two stores 401 and 402 are provided. If the coefficients X and Y are changing, successive truth tables are calculated in processor 101 and stored in the stores 401 and 402 alternately. The 1-bit signals are fed to stores 401 and 402 alternately via an input multiplexer 111 and outputs are taken from the stores via an output multiplexer 112 alternately. The stores are alternately enabled for writing the truth tables therein and for reading out the bits of the sum in accordance with A and B by a control processor 403 which also controls the multiplexers.

Whilst one store e.g 402 receives inputs A and B to read out the sum, the other store receives a new truth table.

Whilst signals A and B address store 401, the truth table is recalculated for the next values of X and Y and stored in store 402 which is then addressed by A and B. By alternating between stores 401 and 402 the sums AX and BY can be quickly calculated for varying values of X and Y.

The processor 101 for calculating the truth table and the coefficient generator 100 may be implemented by a programmed computer indicated by 102 in FIG. 10.

The writable stores 40, 401 and 402 may be programmable gate arrays.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

CALCULATING COEFFICIENTS

This annex outlines a procedure for analysing a fifth order DSM and for calculating coefficients of a desired filter characteristic.

Figure 12:
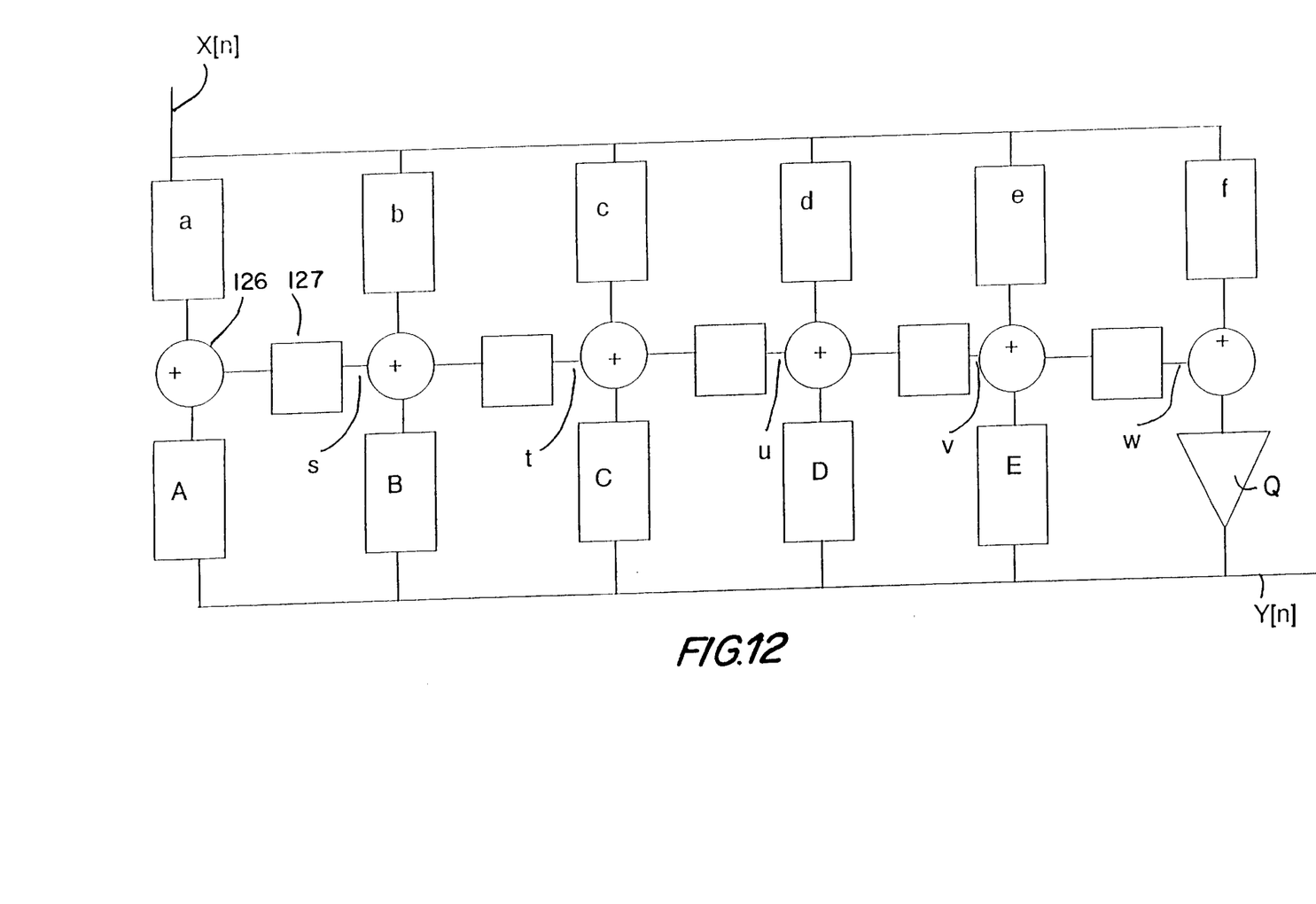
FIG. 12 is a schematic block diagram of a Delta Sigma Modular.

A fifth order DSM is shown in FIG. 12 having coefficients a to f and A to E, adders 12 and intergrators 127. Integrators 127 each provide a unit delay. The outputs of the integrators are denoted from left to right s to w. The input to the DSM is a signal x[n] where [n] denotes a sample in a clocked sequence of samples. The input to the quantizer Q is denoted y[n] which is also the output signal of the DSM. The analysis is based on a model of operation which assumes quantizer Q is simply an adder which adds random noise to the processed signal. The quantizer is therefore ignored in this analysis.

The signal y[n]=fx[n]+w[n] i.e. output signal y[n] at sample [n] is the input signal x[n] multiplied by coefficient f plus the output w[n] of the preceding integrator 7.

Applying the same principles to each output signal of the integrators 7 results in Equations set 1.

$$y[n] = fx[n] + w[n]$$

$$w[n] = w[n-1] + ex[n-1] + Ey[n-1] + v[n-1]$$

$$v[n] = v[n-1] + dx[n-1] + Dy[n-1] + u[n-1]$$

$$u[n] = u[n-1] + cx[n-1] + Cy[n-1] + t[n-1]$$

$$t[n] = t[n-1] + bx[n-1] + By[n-1] + s[n-1]$$

$$s[n] = s[n-1] + ax[n-1] + Ay[n-1]$$

These equations are transformed into z-transform equations as well known in the art resulting in equations set 2.

$$Y(z) = fX(z) + W(z)$$

$$W(z)(1-z^{-1}) = z^{-1}(eX(z) + EY(z) + V(z))$$

$$V(z)(1-z^{-1}) = z^{-1}(dX(z) + DY(z) + U(z))$$

$$U(z)(1-z^{-1}) = z^{-1}(cX(z) + CY(z) + T(z))$$

$$T(z)(1-z^{-1}) = z^{-1}(bX(z) + BY(z) + S(z))$$

$$S(z)(1-z^{-1}) = z^{-1}(aX(z) + AY(z))$$

The z transform equations can be solved to derive Y(z) as a single function of X(z) (Equation 3)

$$Y(z) = fX(z) + \frac{z^{-1}}{(1-z^{-1})}\left(eX(z) + EY(z) + \frac{z^{-1}}{1-z^{-1}}\left(dX(z) + DY(z) + \frac{z^{-1}}{1-z^{-1}}\left(cX(z) + CY(z) + \right.\right.\right.$$

-continued $$\frac{z^{-1}}{1-z^{-1}}\left(bX(z)+BY(z)+\frac{z^{-1}}{1-z^{-1}}(aX(z)+AY(z))\right)\Bigg)\Bigg)\Bigg)$$

This may be reexpressed as shown in the right hand side of the following equation, Equation 4. A desired transfer function of the DSM can be expressed in series form $$\frac{Y(z)}{X(z)}$$

given in left hand side of the following equation and equated with the right hand side in Equation 4.

$$\frac{Y(z)}{X(z)} = \frac{\alpha_0 + \alpha_1 z^{-1} + \alpha_2 z^{-2} + \alpha_3 z^{-3} + \alpha_4 z^{-4} + \alpha_5 z^{-5}}{\beta_0 + \beta_1 z^{-1} + \beta_2 z^{-2} + \beta_3 z^{-3} + \beta_4 z^{-4} + \beta_5 z^{-5}} =$$

$$\frac{f(1-z^{-1})^5 + z^{-1}e(1-z^{-1})^4 + z^{-2}d(1-z^{-1})^3 + z^{-3}c(1-z^{-1})^2 + z^{-4}b(1-z^{-1}) + z^{-5}a}{(1-z^{-1})^5 - z^{-1}E(1-z^{-1})^4 - z^{-3}D(1-x^{-1})^3 - z^{-3}C(1-z^{-1})^2 - z^{-4}B(1-z^{-1}) - Z^{-5}A}$$

Equation 4 can be solved to derive the coefficients f to a from the coefficients $\alpha_0$ to $\alpha_5$ and coefficients E to A from the coefficients $\beta_0$ to $\beta_5$ as follows noting that the coefficients $\alpha_n$ and $\beta_n$ are chosen in known manner to provide a desired transfer function.

f is the only $z^0$ term in the numerator. Therefore f=$\alpha_0$.

The term $\alpha_0(1-z^{-1})^5$ is then subtracted from the left hand numerator resulting in $\alpha_0+\alpha_1 z^{-1} \ldots + \ldots \alpha_5 z^{-5} - \alpha_0(1-z^{-1})^5$ which is recalculated.

Similarly $f(1-z^{-1})^5$ is subtracted from the right hand numerator. Then e is the only $z^{-1}$ term and can be equated with the corresponding $\alpha_1$ in the recalculated left hand numerator.

The process is repeated for all the terms in the numerator.
The process is repeated for all the terms in the denominator.

We claim:

1. An arithmetic stage for forming the sum AX+BY of the products AX and BY of two 1-bit signals A and B with respective coefficients X and Y, the sum having values +X+Y, +X−Y, −X+Y and −X−Y, each value having p bits where p is at least two, the stage comprising:

means for defining a truth table logically relating logical states of A and B to corresponding sets of p bits representing respective values; and means for receiving signals A and B and outputting the set of p bits corresponding to the received states A and B.

2. The arithmetic stage according to claim 1, wherein the means for defining comprises a memory store for storing the truth table, the truth table being addressable by the signals A and B.

3. The arithmetic stage according to claim 1, wherein the coefficients X and Y are fixed and the values in the truth table are thereby fixed.

4. The arithmetic stage according to claim 1, wherein at least one of the coefficients X and Y is variably set for each calculation and the values in the truth table are variable for each calculation.

5. The arithmetic stage according to claim 4, further comprising means responsive to the coefficients X and Y in which at least one of the coefficients is variable for calculating the truth table with different values for each calculation.

6. The arithmetic stage according to claim 5, wherein said means for defining comprises a pair of memory stores for respectively storing a current truth table which logically relates the logical states of A and B to said sets of p bits representing current values and a next truth table which logically relates the logical states of A and B to said sets of p bits representing next values; further comprising control means for causing said next truth table to be stored in one of the memory stores whilst the other memory store is addressed by said 1-bit signals A and B to output the said sum corresponding to the current values.

7. The arithmetic stage according to claim 1, further comprising a Delta-Sigma Modulator.

8. The arithmetic stage according to claim 1, further comprising an audio signal processor.

9. An arithmetic stage for forming the sum AX+BY of the products AX and BY of two 1-bit signals A and B with respective coefficients X and Y, the sum having values +X+Y, +X−Y, −X+Y and −X−Y, each value having p bits, the stage comprising:

an input for receiving said signals A and B; and a plurality of logic gates implementing the logical function relating the logical states of A and B to the corresponding sets of P bits representing the sum AX+BY.

10. The arithmetic stage according to claim 9, wherein the logic circuit comprises a number P of logic gates each logic gate generating a respective bit of said values.

11. The arithmetic stage according to claim 7, further comprising a Delta-Sigma Modulator.

12. The arithmetic stage according to claim 7, further comprising an audio signal processor.

13. An arithmetic stage for forming an arithmetic function of the values of two 1-bit signals, the function having values dependent on the values of the two 1-bit signals, each value having p bits where p is at least two, the arithmetic stage comprising:

means for defining a truth table logically relating logical states of A and B to corresponding sets of p bits representing respective ones of said values; and means for receiving A and B and outputting the set of p bits corresponding to the received states A and B.

14. The arithmetic stage according to claim 9, further comprising a Delta-Sigma Modulator.

15. The arithmetic stage according to claim 13, further comprising an audio signal processor.

* * * * *